United States Patent [19]

Kunz

[11] Patent Number: 5,034,287
[45] Date of Patent: Jul. 23, 1991

[54] FUEL CELL COOLING USING HEAT OF REACTION

[75] Inventor: Harold R. Kunz, Vernon, Conn.

[73] Assignee: International Fuel Cells Corporation, South Windsor, Conn.

[21] Appl. No.: 512,914

[22] Filed: Apr. 23, 1990

[51] Int. Cl.$^5$ .............................................. H01M 8/04
[52] U.S. Cl. ........................................ 429/13; 429/26; 429/30
[58] Field of Search ...................... 429/13, 26, 30, 120

[56] References Cited

U.S. PATENT DOCUMENTS

| | | | |
|---|---|---|---|
| 4,567,117 | 1/1986 | Patel et al. | 429/26 X |
| 4,591,538 | 5/1986 | Kunz | 429/16 |
| 4,640,873 | 2/1987 | Tajima et al. | 429/26 X |
| 4,857,420 | 8/1989 | Maricle et al. | 429/30 |

OTHER PUBLICATIONS

"The Chemical Heat Pipe, EVA and ADAM", published in the Interdisciplinary Science reviews, vol. 6, No. 3, 1981, (Heyden & Son Ltd, 1981), Dipl.-Ing. Ralf E. Harth and Dr-Ing. Udo Boltendahl, from pp. 221-228.

Primary Examiner—Anthony Skapars
Attorney, Agent, or Firm—McAulay Fisher Nissen & Goldberg

[57] ABSTRACT

A fuel cell is cooled by circulating a stream through the cell, the stream containing a reactive material which undergoes an endothermic reaction within the fuel cell, absorbing waste heat. The material, upon leaving the fuel cell, passes through a regenerative heat exchanger where heat is removed. The reacted material then undergoes an exothermic reaction, releasing the waste heat absorbed within the fuel cell. After the exothermic reaction, the material is returned to the fuel cell to repeat the cooling cycle. Utilizing a reactive cooling system based on the heat of reaction as a means for removing waste heat allows reducing the amount of gases supplied to the fuel cell, thus reducing the size of the internal gas passages and consequently, the overall size of the fuel cell while maintaining a high power output.

11 Claims, 2 Drawing Sheets

FUEL CELL COOLING USING HEAT OF REACTION

TECHNICAL FIELD

This invention relates to fuel cells and more particularly to fuel cell cooling using the heat of reaction.

BACKGROUND OF THE INVENTION

Fuel cells use a reaction between a fuel and an oxidizing gas to produce electrical powder. Generally, in the production of such power, waste heat is generated and the fuel cell temperature increases. To maintain cell efficiency, a means for cooling the fuel cell must be provided. Typically, such fuel cells are cooled using a coolant which is circulated through the fuel cell for removing heat for discharge to the atmosphere. The cooled coolant then returns to the fuel cell. Another means for cooling a fuel cell is to allow heat to be removed by flowing an excess of fuel or oxidant through the cell. Thus the excess fuel or oxidant uses the difference in sensible heat to withdraw heat from the cell. The flow rates of these gases are increased to maintain an acceptable fuel cell temperature. However, use of these excess flows leads to excessive pressure loses and excessive evaporation of the liquid electrolyte contained within the fuel cell. In addition, the fuel and oxidizer piping and the passages within the cells must be sized to accommodate these excess flows. The combination of these factors results in a larger than needed fuel cell, which reduces the space available for increasing cell height and power output.

SUMMARY OF THE INVENTION

It is an object of the invention to provide a means for cooling a fuel cell using materials which undergo an endothermic reaction within the fuel cell and, therefore, use the heat of reaction to absorb heat within the fuel cell to provide cell cooling. The reaction product is then removed from the cell and undergoes an exothermic reaction, breaking down the product into its original components, which are then returned to the fuel cell to repeat the cycle. Since with the proper choice of material the heat of reaction is substantially greater than the amount of sensible heat which would be absorbed by simply passing the materials through the fuel cell, a large amount of heat can be removed with a small amount of material, thus reducing the size of the fuel cell passages, and the size of the fuel cell, while maintaining optimum temperature conditions.

In one embodiment, a solid oxide fuel cell has methane as the fuel gas entering the cell, producing hydrogen and carbon dioxide, in an endothermic reaction with the spent fuel gas then passed to a methanator where the hydrogen and carbon dioxide undergo a methanation reaction, exothermally removing heat (QMETH), with the cooled methanated gas then mixed with fresh methane prior to reentry into the fuel cell.

DETAILED DESCRIPTION OF THE INVENTION

Figure 1:
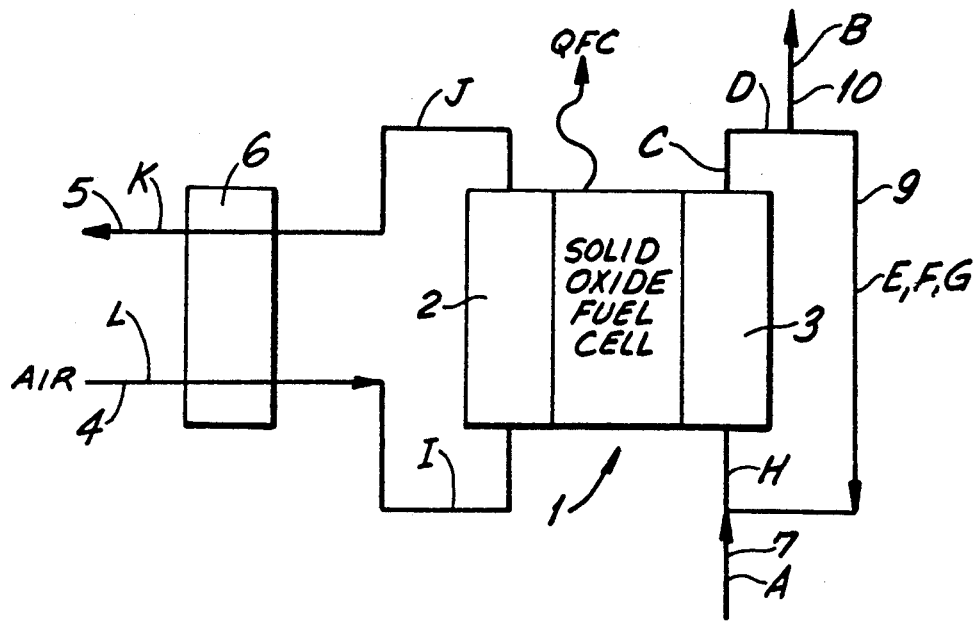
FIG. 1 is an illustration of a prior art fuel cell cooling system.

Referring to FIG. 1, a schematic illustration of a prior art fuel cell cooling system is shown. For illustrative purposes, a solid oxide electrolyte fuel cell stack is described, as this appears to be the most economical application for the present invention. However, while the economics may justify use of the invention on such a fuel cell at the present time, it is contemplated that the cooling system could be used with all other types of fuel cells. For ease in illustration, a detailed description of the internal fuel cell component have been omitted. However, typical fuel cells are described in U.S. Pat. Nos. 4,591,538, 4,857,420 and 3,615,839.

Referring still to FIG. 1, a solid oxide electrolyte fuel cell 1 is shown. The fuel cell 1 has a cathode 2 and an anode 3. An air feed stream 4, and an air return stream 5 pass through the cathode. Typically, the entering air is preheated in an interchanger 6, through which both streams pass. A fuel feed stream 7 passes through the anode 3. Typically, a portion 9 of the fuel is recirculated through the anode, by mixing with the feed stream 7. A vent stream 10 removes a portion of the spent gases.

A typical fuel for such a fuel cell is methane, but of course other fuels may be used. While air is shown as the preferred oxidizer, it should be noted that other oxidizers besides air could also be used. Typically, solid oxide fuel cells operate at a temperature of about 900° C., and excess air is circulated through the fuel cell to provide the major portion of the cell cooling. Thus, the passages through the fuel cell must be sized to accommodate the excess air flow.

Figure 2:
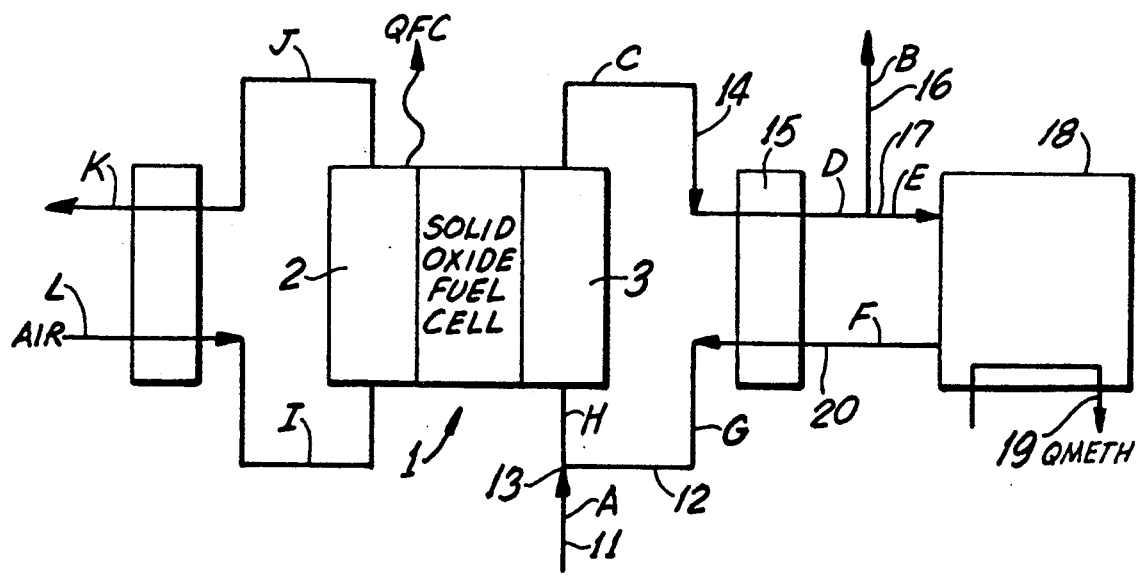
FIG. 2 is a schematic illustration of the reactive cooling system of the present invention.

To obtain cooling using the heat of reaction, according to the present invention, a reforming reaction is undertaken within the fuel cell. Referring to FIG. 2, a fuel stream 11 comprising methane is fed to the anode 3. A return stream 12 containing methane, water, hydrogen, carbon monoxide and carbon dioxide is mixed at 13 with the fresh methane stream 11. Since the fuel cell operates at a temperature of about 900° C., a reformation reaction occurs within the fuel cell which is endothermic, absorbing about 194 KJ per mole.

The Reactions Occurring Within the Fuel Cell Are:

$$CH_4 + 2H_2O \rightarrow 4H_2 + CO_2 \quad (1)$$

$$\text{or } CH_4 + H_2O \rightarrow 3H_2 + CO \quad (2)$$

At 900° C.:

| | |
|---|---|
| $CO_2$: | $H_f = -395.050$ kj/mole |
| $H_2$: | $H_f = 0$ |
| $CH_4$: | $H_f = -91.437$ kj/mole |
| $H_2O$: | $H_f = -248.997$ kj/mole |

A hot spent fuel stream 14 leaves the cell and enters a regenerative heat exchanger 15 at a temperature of about 900° C. and is cooled through interchange with the methanator return stream 12. After passing through the regenerator, a portion 16 of the spent fuel is vented to a burner (not shown). This maintains a steady state flow stream around the fuel cell. A cooled spent stream 17 then enters a methanator 18 and a methanation reaction occurs which is exothermic, releasing the heat absorbed during reformation within the fuel cell.

In Methanator:

$$4H_2 + CO_2 \rightarrow CH_4 + 2H_2O \quad (3)$$

$$\text{or } 3H_2 + CO \rightarrow CH_4 + H_2O \quad (4)$$

This heat released in the methanator is transferred to a cooling medium 19 which passes through the methanator. The medium may be water or air, with air preferred. A methanated stream 20 leaves the methanator after being cooled to approximately 350° C. in the methanator and then passes through the regenerative heat exchanger 15 where the methanated stream is preheated prior to mixing with the fresh methane stream at 13 for entry into the fuel cell. The quantity of reactants are adjusted to achieve sufficient methane reforming within the fuel cell such that essentially all of the waste heat is removed as the heat of reaction, with the heat removal rate through the fuel cell adjusted by varying the activity of a reforming catalyst disposed with the fuel cell. The preferred catalysts are nickel on magnesium oxide or nickel on alumina pellets placed in the fuel flow channels within the anode side of the fuel cell. Of course, other commercially available catalysts could also be used.

Using the reactive cooling system, the cell can be sized for a high fuel cell oxygen utilization reducing the total amount of oxidant supplied to the fuel cell minimizing the amount of heat removed by the spent oxidant stream. This allows the fuel cell passages to be made smaller and more compact, reducing the overall fuel cell size. It is also expected that the reactive cooling system would provide its optimum benefit in a fuel cell operating at 50% fuel efficiency which typically occurs in applications requiring high current density, and in other lower efficiency applications where a significant amount of waste heat must be removed.

For a 50% efficient fuel cell system, the methanator requires only one-half the moles of air, methane and hydrogen gas recycled as a conventional solid oxide system using cathode air cooling. Methane is reformed directly in the solid oxide fuel cell anode at a temperature of about 900° C. Sufficient methane is present to provide reactant hydrogen and to absorb all the waste heat not removed by the cathode gas stream or through other stack heat losses. A portion of the reformed gas products in the anode exhaust is vented to remove carbon dioxide with the remaining gas being circulated through the methanator. The methanator operates at a temperature of about 350° C. and generates methane from the anode vent gases and releases waste heat to an internal cooling stream through an exothermic reaction.

TABLE 1

| | | | | |
|---|---|---|---|---|
| $Q_{FC}$ | (BTU/HR) | 0.7813E − 02 | Volts/Cell | 0.6230 |
| $Q_{METH}$ | (BTU/HR) | 0.6046E + 05 | $P_{sys}$ (psia) | 15.00 |
| Gross | F/C KW | 51.51 | $T_{Cell}$ (°F.) | 1652. |
| Net | F/C KW | 50.74 | Mechanical Efficiency | 0.9850 |
| $CH_4$ | Formed (MOLES/HR) | 0.3073 | Sys. Eff. (LHV) | 0.5020 |
| $H_2$ | Utilization | 0.8500 | Molar Flux 5/molar flux 2 | 2.520 |
| $O_2$ | Utilization | 0.8000 | $H_2$ Consumed (MOLES/HR) | 3.400 |

| REF FIG. | TEMP. (°F.) | $H_2$ | $H_2O$ | $CH_4$ | CO | $CO_2$ | $O_2$ | $N_2$ | ENTH BTU/LB. |
|---|---|---|---|---|---|---|---|---|---|
| | | | | (MOLES/HR) | | | | | |
| A | 70. | 0.0000 | 0.0000 | 1.0000 | 0.0000 | 0.0000 | 0.0000 | 0.000 | −24516. |
| B | 1042. | 0.3689 | 1.6311 | 0.0000 | 0.2311 | 0.7689 | 0.0000 | 0.000 | −270966. |
| C | 1652. | 1.2985 | 5.7422 | 0.0000 | 0.8137 | 2.7067 | 0.0000 | 0.000 | −888224. |
| D | 1042. | 1.2985 | 5.7422 | 0.0000 | 0.8137 | 2.7067 | 0.0000 | 0.000 | −953896. |
| E | 1042. | 0.9297 | 4.1110 | 0.0000 | 0.5825 | 1.9378 | 0.0000 | 0.000 | −682930. |
| F | 662. | 0.2757 | 4.1503 | 0.3073 | 0.0072 | 2.2058 | 0.0000 | 0.000 | −743394. |
| G | 1552. | 0.2757 | 4.1503 | 0.3073 | 0.0072 | 2.2058 | 0.0000 | 0.000 | −677721. |
| H | 1340. | 0.2757 | 4.1503 | 1.3073 | 0.0072 | 2.2058 | 0.0000 | 0.000 | −702237. |
| I | 1187. | 0.0000 | 0.0000 | 0.0000 | 0.0000 | 0.0000 | 2.1250 | 7.990 | 120028. |
| J | 1652. | 0.0000 | 0.0000 | 0.0000 | 0.0000 | 0.0000 | 0.4250 | 7.990 | 130206. |
| K | 350. | 0.0000 | 0.0000 | 0.0000 | 0.0000 | 0.0000 | 0.4250 | 7.990 | 47419. |
| L | 70. | 0.0000 | 0.0000 | 0.0000 | 0.0000 | 0.0000 | 2.1250 | 7.990 | 37241. |

KW to push following gas stream through 1 psi delta P.

| | | | |
|---|---|---|---|
| Air-Stream | 0.2583 | $CH_4$-Stream | 0.2250E-1 |
| $H_2$-Stream | 0.3672 | Total KW | 0.6510 |

Referring to Table 1, the mass and heat balances for a 50% efficient fuel cell using methanator cooling is shown. The references A-L refer to locations A-L identified in FIG. 2. The operating point was based on one mole per hour methane flow. The net and gross power are estimated, as well as are the parasitic power to pump system gases including air and to recycle hydrogen fuel gas, and for pumping the methane through an assumed 1 psi head rise. For one mole per hour of methane flow there is a gross power output of about 51.5 kw with a total pumping power requirement of about 0.65 kw per psia head rise (1.3%).

TABLE 2

| | | | | |
|---|---|---|---|---|
| $Q_{FC}$ | (BTU/HR) | 0.0000 | Volts/Cell | 0.6230 |
| Sys. Eff. | (LHV) | 0.5020 | $P_{sys}$ (psia) | 15.00 |
| Gross | F/C KW | 51.51 | $T_{Cell}$ (°F.) | 1652. |
| Net | F/C KW | 50.74 | Mechanical Efficiency | 0.9850 |

TABLE 2-continued

| | | | | | |
|---|---|---|---|---|---|
| $H_2$ | Utilization | 0.8500 | Molar flux 5/Molar Flux 2 | | 1.698 |
| $O_2$ | Utilization | 0.2573 | $H_2$ Consumed (Moles HR) | | 3.400 |

| REF FIG. | TEMP. (°F.) | (MOLES/HR) | | | | | | ENTH BTU/LB. |
|---|---|---|---|---|---|---|---|---|
| | | $H_2$ | $H_2O$ | $CH_4$ | CO | $CO_2$ | $O_2$ | $N_2$ | |
| A | 70. | 0.0000 | 0.0000 | 1.0000 | 0.0000 | 0.0000 | 0.0000 | 0.000 | −24516. |
| B | 1652. | 0.3689 | 1.6311 | 0.0000 | 0.2311 | 0.7689 | 0.0000 | 0.000 | −252311. |
| C | 1652. | 0.9951 | 4.4004 | 0.0000 | 0.6235 | 2.0742 | 0.0000 | 0.000 | −680674. |
| D | 1652. | 0.9951 | 4.4004 | 0.0000 | 0.6235 | 2.0742 | 0.0000 | 0.000 | −680674. |
| E | 1652. | 0.6262 | 2.7693 | 0.0000 | 0.3924 | 1.3054 | 0.0000 | 0.000 | −428362. |
| F | 1652. | 0.6262 | 2.7693 | 0.0000 | 0.3924 | 1.3054 | 0.0000 | 0.000 | −428362. |
| G | 1652. | 0.6262 | 2.7693 | 0.0000 | 0.3924 | 1.3054 | 0.0000 | 0.000 | −428362. |
| H | 1340. | 0.6262 | 2.7693 | 1.0000 | 0.3924 | 1.3054 | 0.0000 | 0.000 | −452879. |
| I | 1338. | 0.0000 | 0.0000 | 0.0000 | 0.0000 | 0.0000 | 6.6077 | 24.845 | 410690. |
| J | 1652. | 0.0000 | 0.0000 | 0.0000 | 0.0000 | 0.0000 | 4.9077 | 24.845 | 462677. |
| K | 350. | 0.0000 | 0.0000 | 0.0000 | 0.0000 | 0.0000 | 4.9077 | 24.845 | 167788. |
| L | 70. | 0.0000 | 0.0000 | 1.0000 | 0.0000 | 0.0000 | 6.6077 | 24.845 | 115801. |

KW to push following gas stream through 1 psi delta P.

| | | | |
|---|---|---|---|
| Air-Stream | 0.8033 | $CH_4$-Stream | 0.2550E-01 |
| $H_2$-Stream | 0.5065 | Total KW | 1.335 |

Figure 3A:
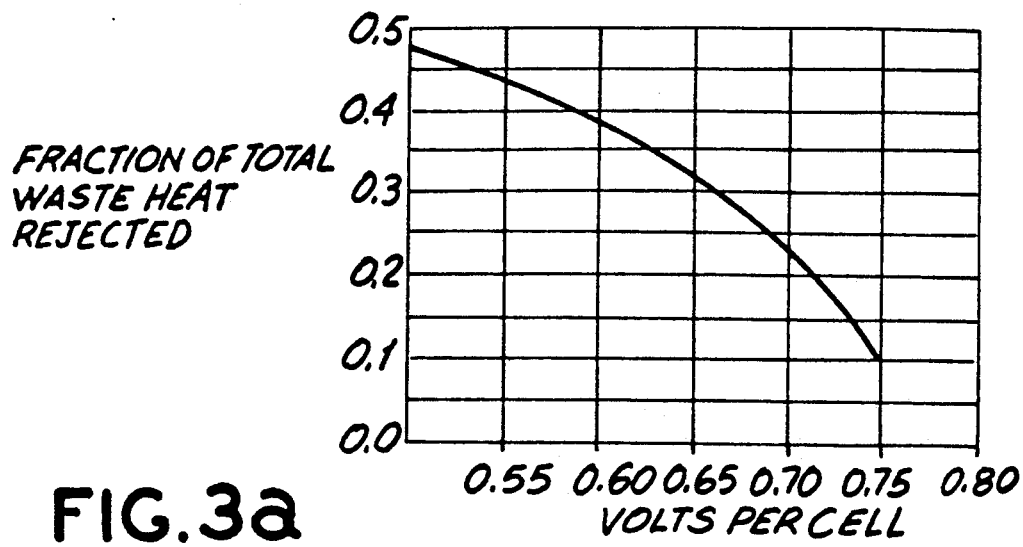
FIGS. 3a and 3b are graphs illustrating the amount of heat removed from a fuel cell using the heat of reaction.
Figure 3B:
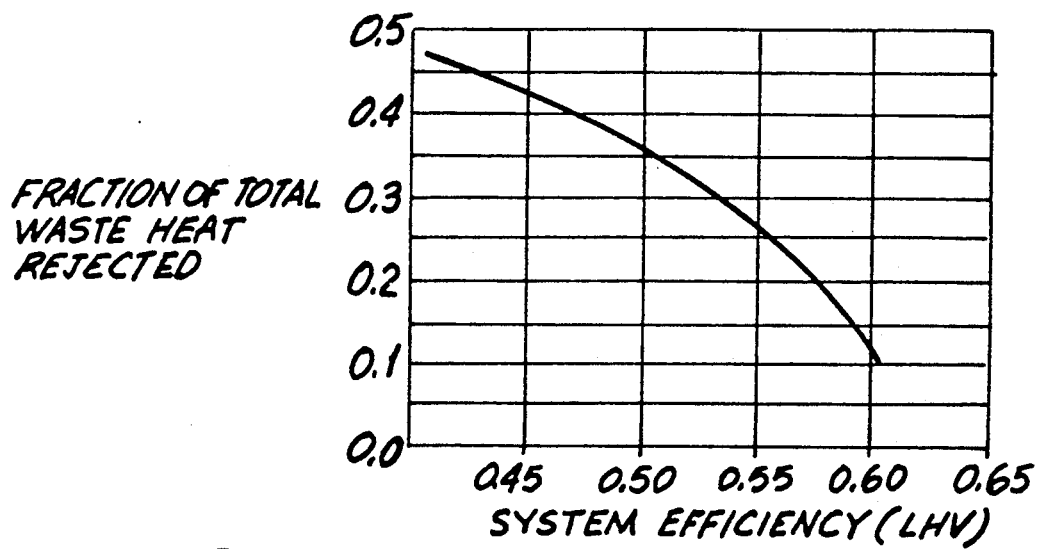

The inventive system was compared with a system using cathode air cooling exclusively as the means for cooling the system. The system efficiency is similarly 50% and Table 2 shows the mass and heat balance for this system. The references A-L refer to locations A-L identified on FIG. 1, and correspond to the locations on FIG. 2. Outputs for this power system were about 51.5 kw of gross power per mole of methane with total parasite power requirements of 1.34 kw per psia head rise (2.6%). A 50% efficient system (0.623 volts per cell) rejects about 35% of the system waste heat from the methanator. Raising the volts per cell to about 0.74 increases the system efficiency to 60% and lowers the amount of waste heat rejected in the methanator to about 12%. FIGS. 3 and 4 show the impact of higher system efficiencies on the amount of waste heat rejected from the methanator, relative to the total waste heat of the system. This implies that higher cell voltages and more efficient operation favor a simpler cathode air cooled solid oxide fuel cell system. However, the methanator version of the system was clearly favorable where oxygen utilization was high in the cathode, i.e., about 80%, substantially reducing the amount of cathode air flow which would be required if it was needed to cool the cell. However, other factors may influence the decision on the type of fuel cell cooling system to use. For example, where size is a concern, the inventive system may be preferred.

Using the heat of reaction to remove waste heat from a fuel cell reduces the air and fuel flow requirements of the system and, therefore, allows reducing the size of the passages within the fuel cell which accommodate these flows. Consequently, the cell stack itself could be reduced in size while maintaining fuel cell voltage output. Thus, such a system has significant advantages in those applications where sizing requirements are critical and high current densities are needed in spite of low efficiencies.

While a methanation reaction is used for illustrative purposes, it is contemplated that other reactive materials may be used to cool a fuel cell using the heat of reaction. Among those contemplated are:

$$CH_4 + CO_2 \rightleftharpoons 2CO + 2H_2$$

$$C_6H_{12} \rightleftharpoons C_6H_6 + 3H_2$$

$$C_7H_{14} \rightleftharpoons C_7H_8 + 3H_2$$

$$C_{10}H_{18} \rightleftharpoons C_{10}H_8 + 5H_2$$

$$C_2H_5Cl \rightleftharpoons C_2H_4 + HCl$$

$$COCl_2 \rightleftharpoons CO + Cl_2$$

$$N_2 + 3H_2 \rightleftharpoons 2NH_3$$

$$2SO_2 + O_2 \rightleftharpoons 2SO_3$$

Of course, other reactive materials could also be used and the invention is not limited by the choice of reactive materials.

While fuel cell cooling using a heat of reaction to reduce reliance on excess gas flows can be beneficial for cooling a solid oxide fuel cell, it will be understood by those skilled in the art that various other fuel cells and systems could utilize the inventive cooling system without varying from the scope of the present invention. For example, while the reactive material is shown supplied with the fuel, it is contemplated that the reactive material may be supplied with the oxidizer, or may be independently supplied to the fuel cell. That negative material may be used to transport cell waste heat to locations when it can be employed for purposes such as space heating. Also, the invention is not limited to gaseous reactive materials.

I claim:

1. A fuel cell having means for passing an air stream through the fuel cell, means for passing a fuel stream through the fuel cell and means for cooling of the fuel cell, the cooling means comprising:

a first reactive material, capable of undergoing an endothermic reaction within the fuel cell; means for supplying the reactive gas to the fuel cell, the reactive material reacting endothermically within the fuel cell to absorb heat and form reactive products; means for removing the reactive products from the fuel cell and means for reacting the reactive products in an exothermic reaction to discharge the heat absorbed within the fuel cell.

2. The fuel cell of claim 1, wherein the first reactive material is methane.

3. The fuel cell of claim 1, wherein the first reactive material is supplied to the fuel cell with the means for passing the fuel stream through the fuel cell.

4. The fuel cell of claim 1, wherein the first reactive products are hydrogen and carbon dioxide.

5. The fuel cell of claim 1, wherein the means for reacting the reactive products is a methanator.

6. The fuel cell of claim 5, wherein the methanator further comprises means for removing heat therefrom.

7. The fuel cell of claim 5, wherein the methanator has a cooling medium passing therethrough for removing heat therefrom.

8. The fuel cell of claim 1, further comprising means for removing spent fuel from the fuel cell, and means for venting a portion of the spent fuel.

9. The fuel cell of claim 1, further comprising interchange means for cooling the spent fuel stream prior to entering the methanator.

10. The fuel cell of claim 1, wherein the fuel cell is a solid oxide fuel cell.

11. A method for cooling a fuel cell comprising:
providing a first reactive material capable of undergoing an endothermic reaction within the fuel cell;
supplying the reactive material to the fuel cell;
reacting the reactive material endothermically within the fuel cell to absorb heat and form reactive products;
removing the reactive products from the fuel cell;
cooling the reactive products; and,
reacting the reactive product in an exothermic reaction to discharge the heat absorbed within the fuel cell.

* * * * *